Sept. 5, 1967  TOYOSUKE TSUDA  3,339,440
MULTISPINDLE AUTOMATIC LATHES

Filed April 16, 1965  2 Sheets-Sheet 1

INVENTOR
Toyosuke Tsuda

Paul M. Craig, Jr.
ATTORNEY

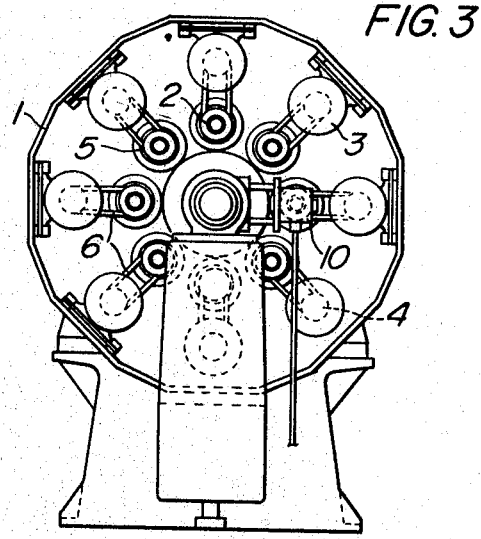
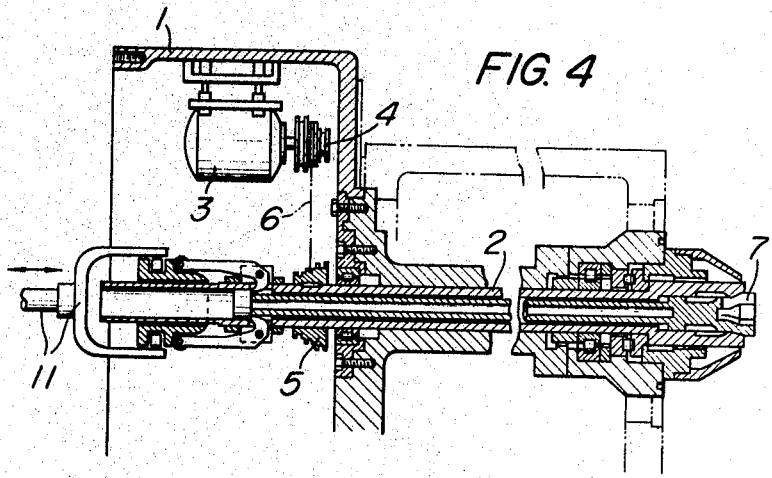

United States Patent Office 3,339,440
Patented Sept. 5, 1967

3,339,440
MULTISPINDLE AUTOMATIC LATHES
Toyosuke Tsuda, Kariya-shi, Japan, assignor to Tsuda Iron Works Ltd., Kariya-shi, Aichi-ken, Japan, a corporation of Japan
Filed Apr. 16, 1965, Ser. No. 448,677
7 Claims. (Cl. 82—3)

This invention relates to multispindle automatic lathes and more particularly to lathes of the above-described type in which means are provided to drive each spindle by an independent electric motor.

In multispindle automatic lathes of conventional structure hitherto employed, the spindles thereof have been driven by a single electric motor by way of a train of gears. Therefore, in the multispindle automatic lathes of prior type, there has been the necessity of special provision of a drive gear casing to accommodate therein gears so as to drive the spindles by a single motor, and gears to be accommodated therein must be of high precision in order to minimize noises caused thereby and excessive wears thereof. Various other difficulties encountered with the lathe of the type of prior structure include troublesome shifting of gears to attain desired speed variation and among others it is most difficult to selectively vary the speed of individual spindles.

Therefore, it is the primary object of the present invention to provide a multispindle automatic lathe of improved structure in which an independent electric motor is provided for each of the spindles to separately drive the same in order to dispense with the provision of any toothed wheels for the driving of the spindles, thus eliminating the difficulties resulting from the gear drive.

According to the present invention, there is provided a multispindle automatic lathe comprising a motor mounting drum mounted for rotation on a shaft, a plurality of circumferentially spaced spindles journalled in said drum, circumferentially spaced electric motors one for each spindle mounted in said drum in a manner to be radially spaced from said spindles, and means to transmit the driving power from each motor to the corresponding spindle.

Other objects and advantages of the present invention will become apparent from the following description with reference to the accompanying drawings, in which:

FIG. 3 is a side elevational view of the lathe; and

FIG. 4 is an enlarged vertical sectional view of part of the lathe.

Figure 1:
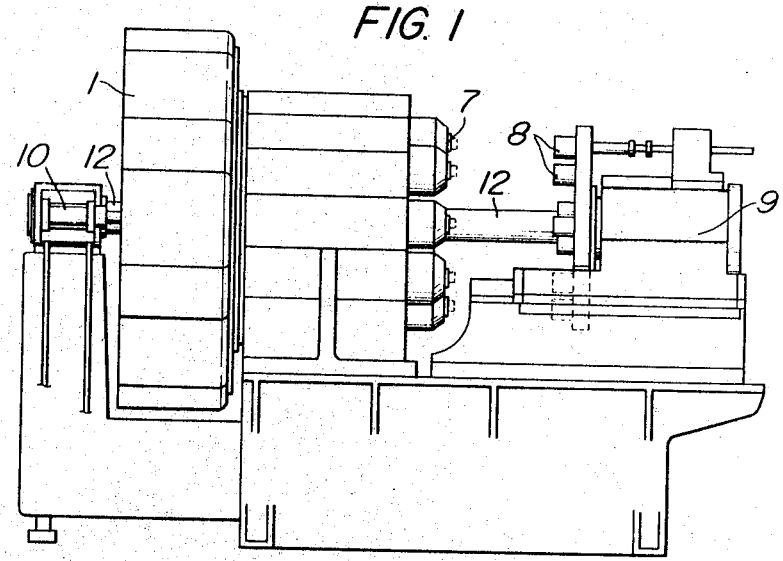
FIG. 1 is a front elevational view of the multispindle automatic lathe embodying the present invention.
Figure 2:
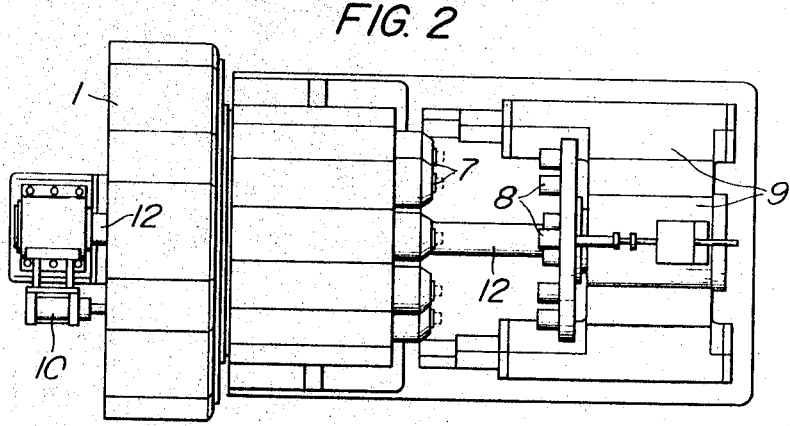
FIG. 2 is a plan view of the lathe.

Referring to the drawings, reference numeral 1 designates a motor mounting drum of substantially U-shaped section, on the inner peripheral wall of which there are mounted a plurality of circumferentially spaced electric motors 3 in a manner that each motor 3 is radially opposed by a spindle 2. A cone pulley 4 is firmly secured on the shaft of each motor 3 and a cone pulley 5 is also firmly secured on the corresponding spindle 2 so that the driving power is transmitted from the motor 3 to the spindle 2 through a transmission belt 6 passed about the pulleys 4 and 5. A collet chuck 7 for holding a workpiece therein is provided at the front end of each spindle 2. The collet chuck 7 is operated by advancing and retracting movement of an actuating rod 11 caused by a hydraulic cylinder 10 when the spindles 2 take a predetermined position at which they align with the hydraulic cylinder 10. The tool post of the lathe comprises tool holders 8 and a slidable carriage 9 therefor. The motor mounting drum 1 is mounted on a rotary shaft 12 so that the drum 1 can be rotated thereabout by drive means of any type well known in the art.

From the foregoing description, it will be understood that the unique arrangement according to the present invention is quite advantageous in that selection and control of normal rotation, reverse rotation and abrupt stopping of the spindles can freely electrically be effected independently of one another in a given cycle, and a suitable combination of electric motors of different outputs can be provided depending on a variety of works. Thus, in the multispindle automatic lathe of the present invention, selection of various numbers of revolutions and operations is far easier than with the lathe of the type driven through a train of gears, and the operation thereof is substantially noiseless because it is free from noises caused by toothed wheels.

Further advantages derived from the invention are ease of motor mounting during replacement or repair of the motors and a low cost of manufacture because toothed wheels of high precision are not involved in the inventive lathe.

What is claimed is:

1. A multispindle automatic lathe comprising: a drum rotatably mounted on a single shaft; said drum being shallow cup-shaped with substantially U-shaped cross-section in substantially all planes passing through the axis of said single shaft defining an interior, a closed end and an open end; a plurality of spindles circumferentially mounted for rotation on said drum within its interior; a separate motor associated with each of said spindles and radially spaced outwardly from its corresponding spindle, and each of said motors being mounted on said drum within its interior and having an armature shaft; said armature shafts and said spindles being mounted parallel to each other and parallel to said single shaft; separate power transfer means consisting essentially of flexible endless drive members and cooperating drive wheels, for forming a direct driving connection between each of said armature shafts and the corresponding spindle; each of said spindles having a terminal portion extending through the closed end of said drum, and a collet chuck mounted on said terminal portion outside of said drum.

2. The lathe of claim 1, said power transfer means being operable to selectively produce any one of a plurality of drive speed ratios between the spindle and armature shaft of each spindle-motor combination.

3. The lathe of claim 2, said endless drive members constituting belts and said drive wheels constituting cone-stepped multiple groove pulleys.

4. The device of claim 2, single actuator means stationarily mounted with respect to said drum for selective successive alignment with each of said collet chucks during rotation of said drum for individually selectively actuating said collet chucks one at a time.

5. The lathe of claim 4, a carriage; a plurality of tool holders mounted on said carriage; means for slidably mounting said carriage for movement toward and away from said drum.

6. The lathe of claim 1, single actuator means stationarily mounted with respect to said drum for selective successive alignment with each of said collet chucks during rotation of said drum for individually selectively actuating said collet chucks one at a time.

7. The lathe of claim 1, a carriage; a plurality of tool holders mounted on said carriage; means for slidably mounting said carriage for movement toward and away from said drum.

References Cited
UNITED STATES PATENTS

| | | | |
|---|---|---|---|
| 1,782,138 | 11/1930 | Davis | 82—3 XR |
| 1,955,220 | 4/1934 | Biewend | 82—3 |
| 1,988,424 | 1/1935 | Schurr | 82—3 XR |
| 2,234,553 | 3/1941 | Drummond | 82—3 XR |
| 2,346,515 | 4/1944 | Staples | 82—3 XR |
| 2,803,840 | 8/1957 | McShirley | 82—3 XR |
| 2,912,892 | 11/1959 | Hoern | 82—3 |
| 3,203,316 | 8/1965 | Cashman | 82—3 XR |

HARRISON L. HINSON, *Primary Examiner.*

UNITED STATES PATENT OFFICE
CERTIFICATE OF CORRECTION

Patent No. 3,339,440                  September 5, 1967

Toyosuke Tsuda

It is hereby certified that error appears in the above numbered patent requiring correction and that the said Letters Patent should read as corrected below.

In the heading to the printed specification, after line 6, insert -- Claims priority, application Japan, Dec. 28, 1964, 39/101790 --.

Signed and sealed this 22nd day of October 1968.

(SEAL)
Attest:

Edward M. Fletcher, Jr.                  EDWARD J. BRENNER
Attesting Officer                        Commissioner of Patents